US008683331B2

(12) United States Patent
Puri et al.

(10) Patent No.: US 8,683,331 B2
(45) Date of Patent: Mar. 25, 2014

(54) RENDERING COLOR IMAGES AND TEXT

(75) Inventors: Atul K. Puri, Delhi (IN); Prashant Verma, Noida (IN); Susanta Sarkar, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 1015 days.

(21) Appl. No.: 11/774,534

(22) Filed: Jul. 6, 2007

(65) Prior Publication Data

US 2013/0208002 A1 Aug. 15, 2013

Related U.S. Application Data

(62) Division of application No. 10/619,740, filed on Jul. 14, 2003, now Pat. No. 7,324,119.

(51) Int. Cl.
*G06F 17/00* (2006.01)

(52) U.S. Cl.
USPC ............................ 715/275; 715/277; 715/204

(58) Field of Classification Search
USPC .......................................... 715/275, 277, 204
See application file for complete search history.

(56) References Cited

U.S. PATENT DOCUMENTS 5,546,528 A * 8/1996 Johnston ....................... 715/807
5,731,823 A 3/1998 Miller et al.
5,987,256 A 11/1999 Wu et al.
6,313,824 B1 * 11/2001 Meisner et al. ............... 345/589
6,411,730 B1 6/2002 Bartell et al.
2002/0077930 A1 * 6/2002 Trubey et al. .................. 705/26
2005/0193372 A1 9/2005 Wu et al.

OTHER PUBLICATIONS

Wagstaff, Sean, Animation on the Web, Publisher: Peachpit Press, Pub Date: Nov. 25, 1998, pp. 1-18.*

Wallace, Shawn, Programming Web Graphics with Perl & GNU Software, Publisher: O'Reilly Media, Inc., Pub Date: Feb. 1, 1999, pp. 1-6.*

Heckbert, Paul S., "Color Image Quantization for Frame Buffer Display," Massachusetts Institute of Technology, Department of Mathematics, May 20, 1980, 20 pages [online]. <http://www-2.cs.cmu.edu/~ph/ciq_thesis>. Retreived from the Internet on Apr. 24, 2003.

Pipenbrinck, Nils "Octree Color Quantization," Apr. 29, 1997 (Revised Apr. 21, 1998), 5 pages [online]. <http://www.cubic.org/~submissive/sourcerer/octree.htm>. Retrieved from the Internet on Apr. 24, 2003.

* cited by examiner

*Primary Examiner* — Nathan Hillery
(74) *Attorney, Agent, or Firm* — Finch & Maloney PLLC

(57) ABSTRACT

Methods and apparatus, including computer program products, implement techniques for configuring at least a portion of a document for display in a display environment. The techniques include generating a document color palette for all or a portion of an electronic document, where the colors of the document color palette are selected based on colors of a plurality of color containing objects in the document or portion thereof, and generating a plurality of views of the document, two or more of the views being based on different color palettes. The plurality of views includes a document view including each of the plurality of color containing objects, where each color containing object in the document view is represented using the document color palette.

9 Claims, 3 Drawing Sheets

RENDERING COLOR IMAGES AND TEXT

CROSS-REFERENCE TO RELATED APPLICATIONS

This application is a divisional application and claims priority to U.S. application Ser. No. 10/619,740 filed on Jul. 14, 2003.

BACKGROUND OF THE INVENTION

The present invention relates to rendering electronic documents that contain color images and text.

Electronic documents can be displayed on many different types of electronic devices and using different display applications. Electronic documents can include content in a variety of colors, and can be stored and/or displayed using different color palettes. A palette is a set of colors used to render one or more objects, such as text objects or graphics objects. The palette used to display an object can depend on the available storage and/or the processing power. For example, a display environment, such as a device or application, may be able to display rich text documents that combine text and graphics using multiple palettes or a single palette. The number of colors supported by the display environment can also vary because of available storage and/or processing power.

A technique for displaying rich text documents is to render them using vector graphics. Rendering using vector graphics includes non-trivial computing, which may not be efficient on low power devices. Another technique is to convert the document into a raster image. A raster image includes a collection of individual pixels, one pixel for each point on a computer screen. Raster images can have storage requirements that are too high for limited storage devices.

Handheld devices are one category of electronic devices that can be used to store and display electronic documents. Typical handheld devices are constrained in both the amount of memory available and processing power. Documents can be loaded on to handheld devices from computers or other devices. For example, a document can be loaded on to a handheld device through a desktop application of a computer. The number of colors supported by handheld devices may be less than the number of colors supported in the desktop application. The desktop application configures a document, if necessary, for viewing and storage in a handheld device. The configured document is transmitted to the handheld device through a synchronization interface for the handheld, such as a HotSync® interface distributed by Palm, Inc. of Milpitas, Calif. Then, the transferred document can be viewed in the handheld.

If the device has one system palette, one approach for displaying an image on the device is to modify the system palette based on the colors in the image. The system palette is then changed again to display a second image. Another approach is to modify all color images and text so that they use the colors in the system palette.

SUMMARY OF THE INVENTION

The invention provides methods and apparatus for displaying rich text documents in a manner that best preserves the color content of objects in these types of documents, while satisfying the number of colors supported in the display environment.

In general, in one aspect, the invention features methods and apparatus, including computer program products, implementing techniques for configuring at least a portion of a document for display in a display environment. The techniques include generating a document color palette for all or a portion of an electronic document, where the colors of the document color palette are selected based on colors of a plurality of color containing objects in the document or portion thereof, and generating a plurality of views of the document, two or more of the views being based on different color palettes. The plurality of views includes a document view including each of the plurality of color containing objects, where each color containing object in the document view is represented using the document color palette.

Particular implementations can include one or more of the following features. The document color palette can be associated with the document or document portion. Generating the document color palette can include selecting a set of colors based on selection factors and colors in the plurality of color containing objects. The selection factors can include at least one of most used colors in the plurality of color containing objects, colors common to the plurality of objects, and a set of substitutable colors. Generating a document color palette can include creating a bitmap of the document or portion thereof and reducing the colors of the bitmap to generate the document color palette. Reducing the number of colors of the bitmap can include selecting a subset of colors of the bitmap, the subset being selected based on the number of colors supported in the display environment. The bitmap can include N colors and the subset of colors can include M colors, where $M<N$.

The document or document portion can be rendered in the display environment using the document view. The objects can include at least one graphics object and at least one text object, each text object including one or more characters of text. Generating a plurality of views of the document can include generating an object view of one or more of the plurality of graphics objects in an electronic document, where each object view is based on a corresponding object color palette of the corresponding graphics object, and each object color palette includes a set of colors optimized for the corresponding graphics object. An object color palette can be generated for each of the one or more of the plurality of graphics objects. The object views can be stored in the electronic document so that each object view is associated with a corresponding document view.

The plurality of views can include two different document views, each document view based on a different document color palette.

In general, in another aspect, the invention features methods and apparatus, including computer program products, implementing techniques for rendering an image in a display environment. The techniques include receiving an electronic document including multiple views for each of a plurality of graphics objects of the electronic document, where a first view for each graphics object is based on a color palette for the graphics object and a second view for each graphics object is based on a document color palette for an associated portion of the electronic document, and rendering the portion of the electronic document according to the second view of each of the plurality of graphics objects.

Particular implementations can include one or more of the following features. The techniques can also include receiving input selecting a graphics object in the electronic document and rendering the selected graphics object according to the first view of the selected graphics object. The portion of the electronic document can include at least one text object, where each text object includes one or more characters of text and associated color content, and the at least one text object can be rendered using the document color palette for the portion of the electronic document.

In general, in another aspect, the invention features methods and apparatus, including computer program products, implementing techniques for configuring at least a portion of a document for display in a display environment. The techniques can include receiving an electronic document including multiple graphics objects and generating a display document including multiple views of each of the multiple graphics objects, where each view of the multiple views is based on a different color palette and represents a different portion of the electronic document.

The invention can be implemented to realize one or more of the following advantages. A document palette is derived from color palettes of objects, such as text objects and graphics objects, in a document or a portion of a document to be displayed in a single-palette display environment so that the objects in a document or document portion configured for display in the single-palette display environment can be displayed together. Thus, two or more graphics objects can be displayed in the single-palette display environment so that one graphics object will not be rendered using a palette corresponding to another graphics object, but instead using a document palette optimized to best represent the colors in all of the graphics objects to be displayed in the document or document portion. For example, a second graphics object displayed in the single palette display environment will not be rendered using a palette generated for only a first graphics object since both objects are considered when generating the document palette. Associating an object view for each graphics object of the document or document portion with the configured document or document portion allows each graphics object to be displayed individually in the single-palette environment using its own individual color palette.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

A technique for configuring at least a portion of an electronic document including color graphics and color text in a single palette display environment includes generating a document view for displaying the portion of the electronic document using a common color palette, based on colors represented in each color containing object (e.g., graphics objects and text objects) in the electronic document or portion thereof. A separate view for each graphics object can be associated with the document view so that each graphics object can displayed separately in the single palette display environment using a color palette derived for the object. For the purposes of this specification, a "display environment" is defined as any device or application that can be used to display a document. A "single palette" display environment includes any application or device that supports only a single palette for any reason, such as limitations on storage space or processing time. An "object" includes any viewable object or grouping of objects. For example, an object can include a graphics object or a text object, where the text object includes an individual character, a word, or a group of words.

An electronic document does not necessarily correspond to a file. A document may be stored in a portion of a file that holds other documents, in a single file dedicated to the document in question, or in multiple coordinated files.

Figure 1:
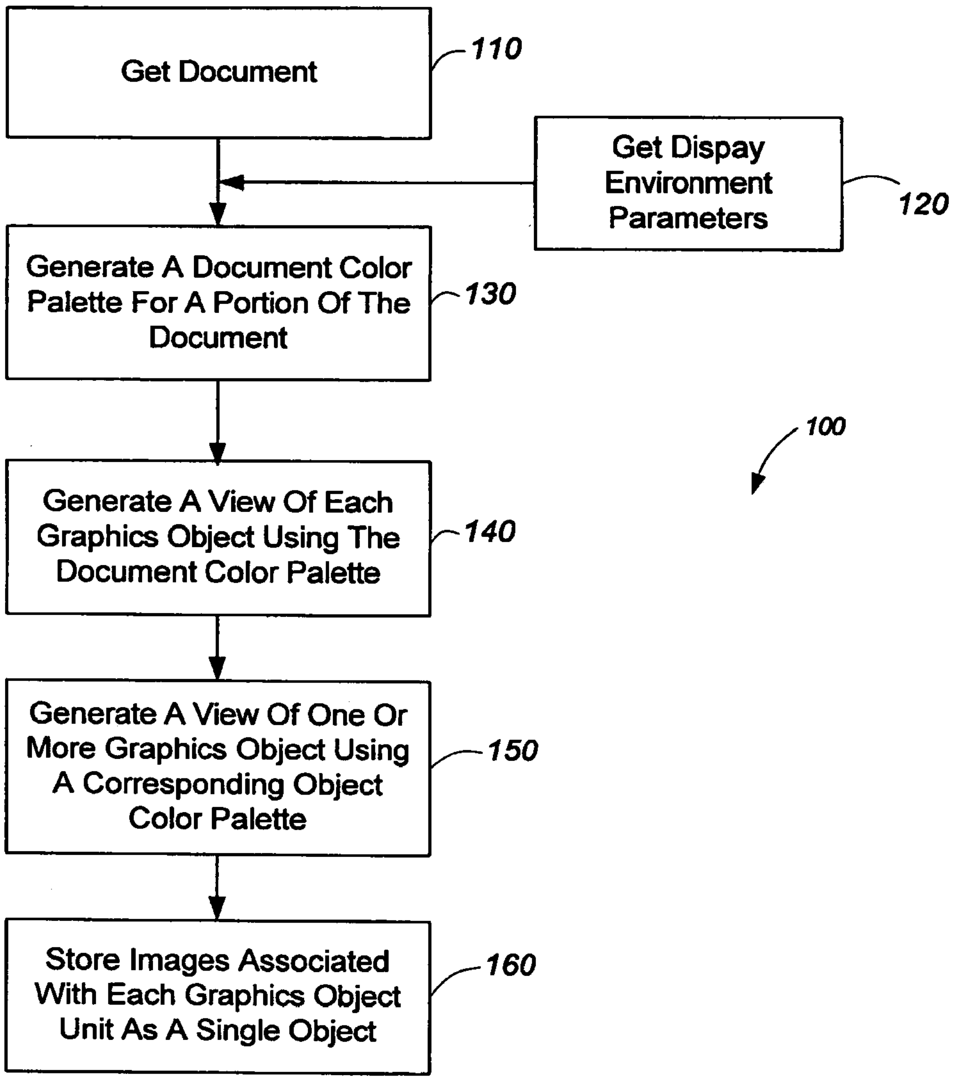
FIG. 1 is a flow diagram illustrating a method of configuring an electronic document for a single-palette display environment.

FIG. 1 is a flow diagram illustrating a method 100 of configuring an electronic document for use in a single palette display environment. A configuration application initiates the configuration method by getting a document to be configured for the single palette display environment (step 110). The electronic document can include a rich text document that includes text and graphics, such as line art or images, which can include maps, photographs, and the like. The single palette display environment can include a device, such as a handheld device, an application running in a computer, or a computer system.

The configuration application then gets parameters for the display environment (step 120). The display environment parameters include the number of colors supported by the display environment, or parameters from which the number of colors supported by the display environment can be derived.

The configuration application generates a document color palette for the document or a portion of the document (step 130). In one implementation, the configuration application does so by first generating a bitmap of the document or relevant portion thereof. Generating the bitmap causes all objects in the document or document portion to be rendered into a corresponding bitmap.

The configuration application then reduces the number of colors of the bitmap. A document color palette is a color palette that is optimized to display the color containing objects in the document or relevant portion thereof, and can be generated by selecting colors from the bitmap representation of the document or document portion (or by selecting colors derived from the colors in the bitmap). A document color palette can be determined by reducing the number of colors in the palette for the bitmap from N colors, where N is the number of colors contained in the bitmap, to M colors, where M is the number of colors supported by the display environment and M is less than N. The document color palette can be derived using any known technique for color quantization, i.e., reducing a large set of colors to a smaller fixed set of colors, such as those described in U.S. Pat. No. 6,411,730 and P. Heckbert, SIGGRAPH '82, July 1982, pp. 297-307, each of which is incorporated by reference.

The document color palette can be determined by choosing the best M colors for representing the bitmap of the portion of interest. Thus, if Object A contains colors {ca1, ca2, ca3 . . . cax}, Object B contains colors {cb1, cb2, cb3 . . . cby}, and color text in the portion of interest contains colors {cc1, cc2, cc3 . . . ccz}, an example of a document color palette might include the set {ca1, ca3, cb1, cb4, cc2, cc4 . . . M entries}.

The configuration application generates the document color palette by selecting colors according to rules based on one or more selection factors. Selection factors can include any factors that can be used to select colors for inclusion in the document color palette. Selection factors can thus include, for example, the most used colors in the bitmap, colors common to all or a subset of the objects in the document or relevant document portion, or colors that are substitutable for such colors. Optionally, the configuration application can permit a user to select or identify one or more selection factors to be used to generate the document color palette. Alternatively, the configuration application can generate the document color palette using a predetermined selection factor or factors (which may be arranged in a hierarchy of factors or applied according to a hierarchy of rules). The document color palette is stored with (e.g., in) the document to be rendered in the display environment. The configuration application uses the document color palette to generate a document view of the document or document portion that includes each object in the document or document portion (step 140). The configuration application can do this by generating a bitmap in which each of the objects is represented using colors of the M colors in the document color palette. A "best match" mechanism can be used to generate the document view of each object based on the original object data, such that the "best" (e.g., closest matching) color in the document color palette is used to represent each color in the original object. An example of a best match algorithm is as follows.

Given a graphics object, for example a RGB image IMG, with data {rx1, gx1, bx1, . . . , rxn, gxn, bxn}, and a document color palette ("DCP") with colors {ry1, gy1, by1, . . . , ryk, gyk, byk}, to create a document view image object such that all data in IMG uses RGB values of the document color palette:

```
    for each pixel (ri, gi, bi) in IMG
    do
        minimum_distance = (255*255) *3 + 1
        for each color value in DCP (rj, gj, bj)
        do
            distance = (ri − rj) * (ri − rj) + (gi − gj) * (gi − gj) +
(bi − bj) * (bi − bj)
            if (distance < minimum_distance)
                minimum_distance = distance;
                bestIndex = j;
            endif
        end_for
        /* create the new page view image object using the bestIndex
*/
        r_new[i] = rybestIndex
        g_new[i] = gybestIndex
        b_new[i] = bybestIndex
    end_for
```

As described above, the DCP can be selected based on the document bitmap, which included the original graphics object IMG. Thus, since the IMG has a part in the generation of the document color palette, the Best Match algorithm can usually find close matches in the document color palette.

The document view can be generated using "alternate images" associated with the individual objects, as described in PDF Reference (Third Edition) for Adobe® Portable Document Format® Version 1.4, distributed by Adobe Systems Incorporated of San Jose, Calif., which is incorporated here by reference. Thus, the document view can be stored as an alternate image in the document, and can be used to render the document or a corresponding portion of the document for viewing in the display environment.

Text objects in a given portion of the document are also rendered in the document view using the document color palette. If the original color of the text is not retained in the page color palette, a "best match" algorithm can be used by the display environment to render the text object.

The configuration application also generates an object view of each of one or more objects using a corresponding object color palette (step 150). An object color palette for a particular object can include a set of colors that is optimized for the corresponding object.

Object views can be generated for selected types of objects. For example, if a portion of interest includes color containing graphics objects and color text, the configuration application can be configured to generate object views only for the graphics objects. The object view is generated by generating a bitmap of the original object. The configuration application reduces the colors of the object bitmap as necessary to obtain a set of M colors—the corresponding object color palette—that will be used to render the object view of the object.

The configuration application can reduce the colors of the object bitmap using known techniques, such as the techniques used to reduce the colors of the document (or document portion) bitmap as discussed above. The object view of each graphic object can replace the object in the document. For example, if the document is stored as an Adobe® PDF document, a corresponding object view and object color palette can be stored as the "base image" of a graphics object.

The configuration application stores images associated with each object as a single object (step 160). Thus, two or more images can be stored for each graphics object. The object view provides a separate view of an object that can be used to render the object when the object is to be displayed in isolation in the display environment. This allows individual objects to be rendered using a palette that best represents the original colors of the object (instead of the best colors for the entire document or document portion), while still satisfying the constraints of the display environment. For example, if a user using a handheld device selects (e.g., taps and holds) a graphics object in a document to display the graphics object individually or in isolation, the display environment renders the object view of the selected graphics object, showing just the selected graphics object on the display. The object view can also be used to render a page of the document in the display environment if the display environment has the capability of rendering the object views of each object in a page display.

The configuration application can generate more than one object view per object. For example, if one object view includes a bitmap of the object generated using M colors, another object view can include the original bitmap of the object having N colors. In this example, the M-color object view may be used to display the object on the handheld device, while the N-color object view may be used to display the object view in other (i.e., less constrained) environments. Saving a N-color object view of the object preserves the original color information for use in environments capable of rendering the object in its original colors.

The configured document can be generated and stored as a Portable Document Format ("PDF") document, using, for example, the Adobe® Acrobat® software. The electronic document can be generated using a page-by-page paradigm.

The configured document can be transmitted to and stored in the display environment. The display environment can include the configuring application or an application associated with the configuring application, as well as other applications in the same computer system or applications in other devices or computer systems.

Figure 2:
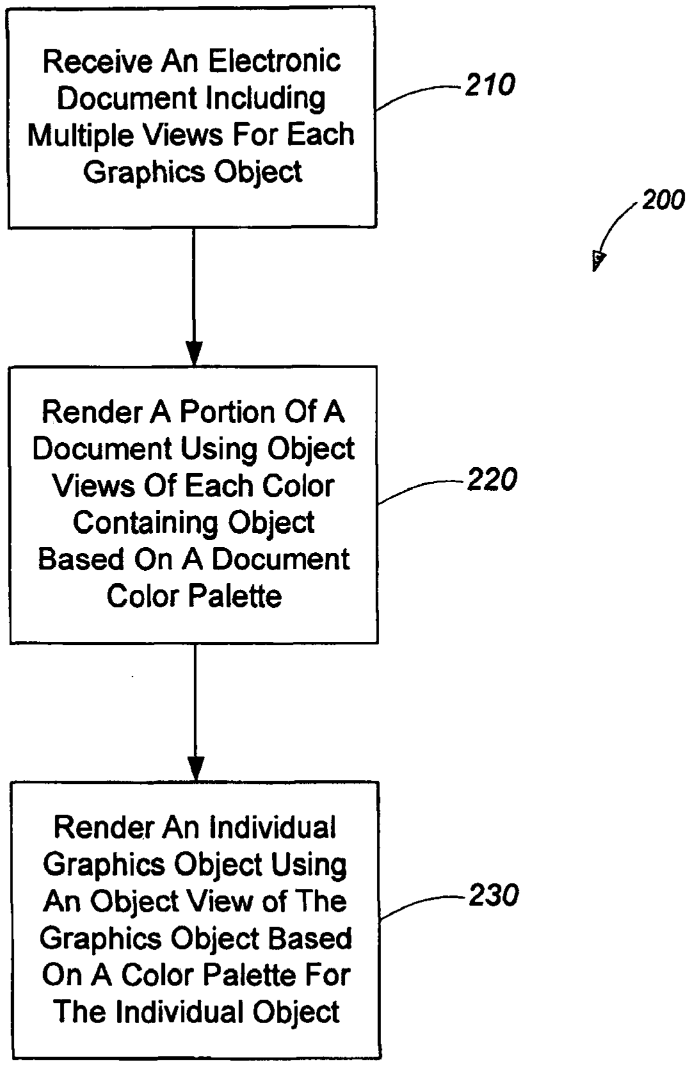
FIG. 2 is a flow diagram illustrating a method of displaying an electronic document configured using a common color palette.

FIG. 2 is a flow diagram illustrating a method 200 of displaying an electronic document configured using a document color palette. A display environment receives an electronic document (step 210). The electronic document includes colored text and one or more colored graphics objects. The electronic document includes at least two views of one or more of the colored graphics objects. A first view includes a first representation of the one or more objects that is generated using an optimized document color palette for the electronic document (or portion thereof). A second view—an object view of the one or more graphics objects—includes a second representation of the one or more objects generated using the corresponding object palette or palettes, as described above with reference to FIG. 1. In one implementation, the first and second representations are bitmaps generated using the relevant color palettes.

The display environment renders portion (e.g., a page) of the electronic document using the first view of the one or more objects (step 220). If a user selects to view one or more of the graphics objects separately, the display environment displays the corresponding object view of the object (step 230). The display environment can be configured to allow alternating displays between two or more views.

Figure 3:
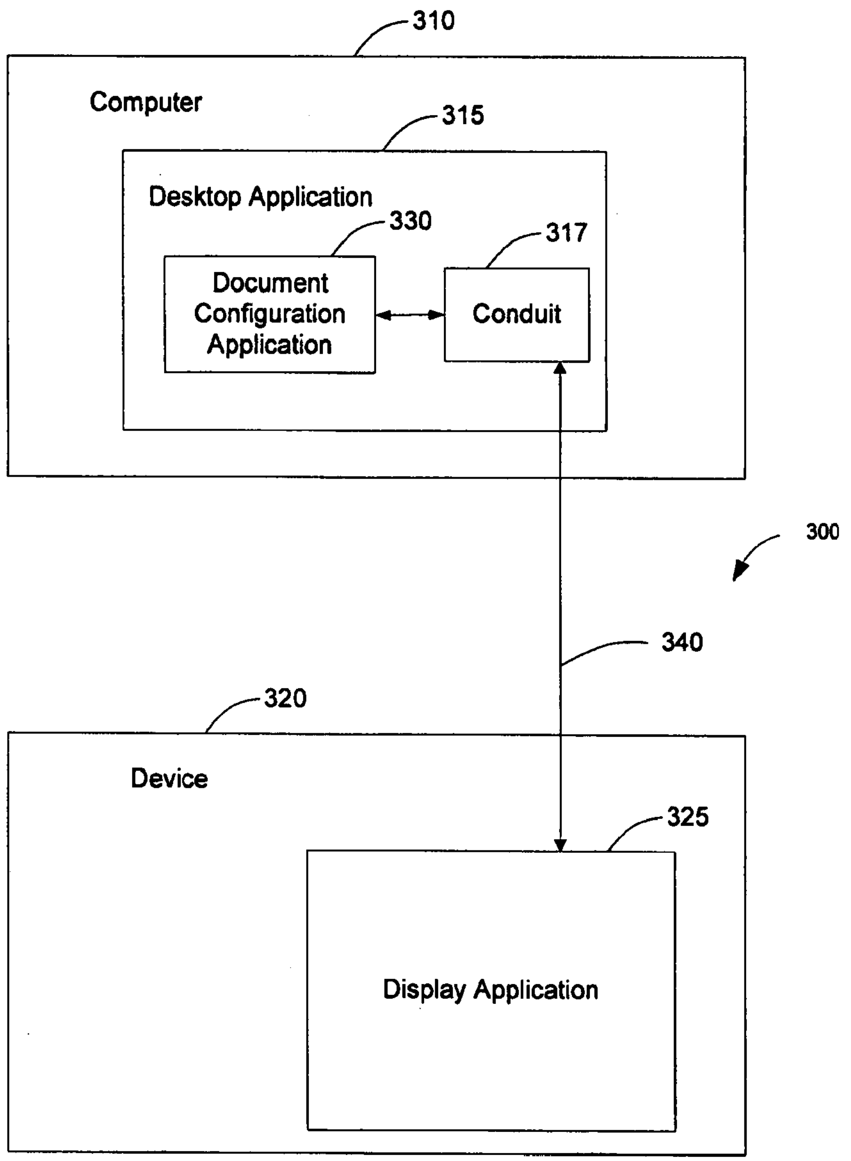
FIG. 3 is a block diagram illustrating a system for configuring an electronic document for storage and display in a display environment.

FIG. 3 is a block diagram illustrating a system 300 for configuring an electronic document on a computer 310 for viewing on a handheld device 320. Computer 310 can include any computer or system capable of running software applications. Handheld device 320 can include a variety of portable devices such as personal digital assistants ("PDAs") or wireless communication devices.

A desktop application 315 running on computer 310 includes a conduit application 317 for transferring a document from computer 310 to handheld device 320. The conduit 317 implements synchronization logic between desktop application 315 and handheld device 320. Conduit 317 can coordinate with a document configuration application 330, which configures a document on computer 310 for storage and viewing on handheld 320. The conduit 317 transfers the configured document to handheld device 320. Although the document configuration application 330 is described with reference to desktop application 315, the document configuration application can reside partially or fully in the handheld device, in an intermediate device located between computer 310 and handheld device 320, or in a remote device such as a server.

Handheld device 320 includes a document display application 325 that can be used to display the configured document received from the computer 310. Handheld device 320 typically includes a processor, memory, and a screen for displaying images that is smaller than a display screen of computer 310. The handheld device 320 can have lower processing power and limited storage capacity in comparison to computer 310.

Desktop application 315 and document display application 325 can be connected through an interface 340. An example of such an interface is the HotSync® interface. The computer 310 can also include an Adobe® Acrobat® plug-in application (not shown) and an Acrobat® Reader® plug-in application (not shown). Each plug-in application allows a user to transfer a currently active PDF document or e-book in Acrobat® or Acrobat® Reader® to a handheld device 320.

In the example of transferring a PDF document to a handheld device, the document display application 325 can include the Acrobat®Reader® for Palm OS® application distributed by Adobe Systems Incorporated of San Jose, Calif. To display a PDF document on screens of different sizes, such as a handheld screen, tags can be defined in the PDF document. The tags define structure and function of the document, and allow elements of the document to be reflowed (i.e., the reading order of text is preserved regardless of screen size).

Desktop application 315 can include a converter dynamic link library ("DLL") and a user interface that runs above the converter DLL. The converter DLL can tag a PDF file and convert it into a format suitable for viewing in the Acrobat® Reader® for Palm OS® application. For example, for some document information types, e.g., vector graphics, text and/or graphics can be converted into raster images for viewing in the handheld.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments. Other embodiments are within the scope of the following claims. For example, the steps of the invention can be performed in a different order and still achieve desirable results. While some implementations have been described in the context of configuring documents for display in a single palette display environment, the techniques described herein can be used to obtain similar benefits in display environments that are not limited to displaying according to a single color palette.

What is claimed is:

1. A method for rendering an image in a display environment, the method including:

receiving an electronic document including multiple views for each of a plurality of graphics objects of the electronic document, a first view for each graphics object being based on a color palette for the graphics object and a second view for each graphics object being based on a document color palette for an associated portion of the electronic document;

rendering, using one or more processors, a rendered portion of the electronic document according to the second view of each of the plurality of graphics objects, such that a plurality of graphics objects within the rendered portion of the electronic document are rendered using the document color palette;

receiving an input selecting a graphics object from the rendered portion of the electronic document, wherein the selected graphics object is to be viewed separately from the rendered portion of the document; and in response to receiving the input, separately rendering the selected graphics object according to the first view of the selected graphics object, such that the selected graphics object is rendered using the color palette for the selected graphics object.

2. The method of claim 1, wherein the rendered portion of the electronic document includes at least one text object, each text object including one or more characters of text and associated color content, the method further comprising:

rendering the at least one text object using the document color palette for the associated portion of the electronic document.

3. A method for configuring at least a portion of a document for display in a display environment, the method including:

receiving an electronic document including multiple graphics objects; and generating, using one or more processors, a display document including multiple views of each of the multiple graphics objects, each view of the multiple views based on a different color palette and representing a different portion of the electronic document, where rendering the generated display document includes rendering each of the multiple graphics objects according to a first view and where rendering a selected graphical object of the display document includes rendering the selected graphical object according to a second view separately from the rendered display document, wherein the selected graphical object is rendered according to the second view in response to receipt of an input identifying the selected graphical object while it is being rendered according to the first view.

4. A computer program product, tangibly stored on a machine-readable storage device, for configuring at least a portion of a document for displaying in a display environment, the product comprising instructions operable to cause a computer system to:

receive an electronic document including multiple views for each of a plurality of graphics objects of the electronic document, a first view for each graphics object being based on a color palette for the graphics object and a second view for each graphics object being based on a document color palette for an associated portion of the electronic document;

render a rendered portion of the electronic document according to the second view of each of the plurality of graphics objects, such that a plurality of graphics objects within the rendered portion of the electronic document are rendered using the document color palette;

receive an input selecting a graphics object from the rendered portion of the electronic document, wherein the selected graphics object is to be viewed separately from the rendered portion of the document; and in response to receiving the input, separately render the selected graphics object according to the first view of the selected graphics object, such that the selected graphics object is rendered using the color palette for the selected graphics object.

5. The computer program product of claim 4, wherein the rendered portion of the electronic document includes at least one text object, each text object including one or more characters of text and associated color content, the computer program product further comprising instructions operable to cause a computer system to:

render the at least one text object using the document color palette for the associated portion of the electronic document.

6. A computer program product, tangibly stored on a machine-readable storage device, for configuring at least a portion of a document for displaying in a display environment, the product comprising instructions operable to cause a computer system to:

receive an electronic document including multiple graphics objects; and generate a display document including multiple views of each of the multiple graphics objects, each view of the multiple views based on a different color palette and representing a different portion of the electronic document, where rendering the generated display document includes rendering each of the multiple graphics objects according to a first view and where rendering a selected graphical object of the display document includes rendering the selected graphical object according to a second view separately from the rendered display document, wherein the selected graphical object is rendered according to the second view in response to receipt of an input identifying the selected graphical object while it is being rendered according to the first view.

7. A system comprising:

one or more processors configured to perform operations including:

receiving an electronic document including multiple views for each of a plurality of graphics objects of the electronic document, a first view for each graphics object being based on a color palette for the graphics object and a second view for each graphics object being based on a document color palette for an associated portion of the electronic document;

rendering a rendered portion of the electronic document according to the second view of each of the plurality of graphics objects, such that a plurality of graphics objects within the rendered portion of the electronic document are rendered using the document color palette;

receiving an input selecting a graphics object from the rendered portion of the electronic document, wherein the selected graphics object is to be viewed separately from the rendered portion of the document; and in response to receiving the input, separately rendering the selected graphics object according to the first view of the selected graphics object, such that the selected graphics object is rendered using the color palette for the selected graphics object.

8. The system of claim 7, wherein the rendered portion of the electronic document includes at least one text object, each text object including one or more characters of text and associated color content, the system further configured to perform operations comprising:

rendering the at least one text object using the document color palette for the associated portion of the electronic document.

9. A system comprising:

one or more processors configured to perform operations including:

receiving an electronic document including multiple graphics objects; and generating a display document including multiple views of each of the multiple graphics objects, each view of the multiple views based on a different color palette and representing a different portion of the electronic document, where rendering the generated display document includes rendering each of the multiple graphics objects according to a first view and where rendering a selected graphical object of the display document includes rendering the selected graphical object according to a second view separately from the rendered display document, wherein the selected graphical object is rendered according to the second view in response to receipt of an input identifying the selected graphical object while it is being rendered according to the first view.

* * * * *